US006442461B2

United States Patent
Matsuo (10) Patent No.: US 6,442,461 B2
(45) Date of Patent: Aug. 27, 2002

(54) APPARATUS AND METHOD FOR CORRECTING INFORMATION STORAGE POSITION

(75) Inventor: Kazunori Matsuo, Saitama-ken (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/783,006

(22) Filed: Feb. 15, 2001

(30) Foreign Application Priority Data

Feb. 18, 2000 (JP) ........................................ 2000-040619

(51) Int. Cl.[7] .............................................. B60Q 11/00
(52) U.S. Cl. ............................ 701/35; 246/45; 340/436
(58) Field of Search ....................... 701/35; 73/514.32, 73/514.02; 434/305; 340/436; 246/45

(56) References Cited

U.S. PATENT DOCUMENTS 5,325,082 A * 6/1994 Rodriguez .................. 340/438
6,308,177 B1 * 10/2001 Israni et al. ................ 707/100

* cited by examiner

Primary Examiner—William A. Cuchlinski, Jr.
Assistant Examiner—Marthe Y. Marc-Coleman
(74) Attorney, Agent, or Firm—Arent Fox Kintner Plotkin & Kahn (57) ABSTRACT

An information read/write apparatus which can determine the condition under which defragmentation can be performed without causing the storage medium to be affected by running or mechanical vibration of the mobile body. The information read/write apparatus reads and records information on an information storage medium, mounted on a mobile body and allowing information to be read and recorded thereon. The apparatus comprises detection means for detecting that the mobile body is at a standstill. The apparatus also comprises control means for controlling reading and recording of information to relocate information stored on the information storage medium from one to another different position on the information storage medium while the mobile body is being detected to be at a standstill in accordance with output of the detection means.

11 Claims, 5 Drawing Sheets

APPARATUS AND METHOD FOR CORRECTING INFORMATION STORAGE POSITION

BACKGROUND OF THE INVENTION

The present invention relates to an information read/write apparatus with an information storage medium mounted thereto, on which information (data) can be read or recorded repeatedly. More particularly, the present invention relates to defragmentation of the information read/write apparatus mounted on a vehicular mobile body such as motor vehicles or trains.

In general, information storage media (hereinafter referred to as storage media) on which information (data) can be read or recorded repeatedly include the HDD (Hard Disc Drive), FD (Floppy Disc), MD (Mini-Disc), MO (Magneto Optical), and CD-RW (Compact Disc ReWritable).

For example, the HDD rotates a stack of several discs at high speeds, the surfaces of which are coated with magnetic material and which are arranged cylindrically, and allows the HDC (Hard Disc Controller) to position the magnetic head over the appropriate area of the discs in a non-contact state. The disc is physically formatted for the purpose of recording data thereon and provided with a number of concentric tracks, with each track being numbered. In addition, each of the tracks is divided into a plurality of sectors, each sector being an area of the minimum size for reading and recording data and provided with a sector number. Moreover, a cylinder on which tracks of the same track number are arranged in the shape of the cylinder is given a cylinder number. A combination of these numbers can determine the physical address indicating the location of data. The HDC positions the magnetic head over the sector of the desired physical address to read or record data.

Such a storage medium has been widely used in personal computers as storage media for the management of information. Recently, the storage medium has started being mounted as memory means to a vehicle-mounted information read/write apparatus, such as an audio-visual apparatus or a GPS (Global Positioning System), which is incorporated into a vehicle such as a motor vehicle to cope with an increase in capacity and a decrease in size and cost of the memory means.

Incidentally, upon recording data on a storage medium like the HDD, vacant sectors are searched to be allocated to store data therein in sequence. Thus, such data which exceeds the minimum size of the sector cannot be accommodated in contiguous regions and may be stored in several non-adjacent sectors at various locations of the disc. The repetition of writing data or deleting data files on the disc has resulted in these non-adjacent sectors. Data files to be read from or data to be written onto the disc has to be physically fragmented. As data files increases in number, it takes longer time for the HDD to access the data files. Therefore, the information read/write apparatus is adapted to rearrange fragmented data files on the storage medium. That is, defragmentation of data files is carried out by which the recorded data files are rearranged such that one data file is placed in contiguous sectors in sequence, thereby improving access speeds to provide efficient reading of data files.

However, an user using a conventional information read/write apparatus mounted on a mobile body may carry out the defragmentation of the storage medium during the movement of the mobile body. In this case, running or mechanical vibration of the mobile body may have adverse effect on the storage medium being defragmented. This may lead to a problem of causing an error to occur upon rearrangement of the order of fragmented recorded data files.

SUMMARY OF THE INVENTION

In this context, the present invention was developed to solve the aforementioned problems encountered by the conventional information read/write apparatus. The first aspect of the present invention has an object of providing an information read/write apparatus which can determine the condition under which defragmentation can be performed without causing the storage medium to be affected by running or mechanical vibration of the mobile body.

To achieve the object mentioned above, the present invention provides an information read/write apparatus for reading and recording information on an information storage medium, mounted on a mobile body and allowing information to be read and recorded thereon. The information read/write apparatus is characterized by comprising detection means for detecting that the mobile body is at a standstill. The apparatus is also characterized by comprising a control means for controlling reading and recording of information to relocate information stored on the information storage medium from one to another different position on the information storage medium while the mobile body is being detected to be at a standstill in accordance with output of the detection means.

Furthermore, the present invention is characterized in that the control means controls reading and recording of information to relocate information stored on the information storage medium from one to another different position on the information storage medium when the mobile body is detected to be at a standstill for a predetermined length of time or more in accordance with the output from the detection means.

Furthermore, as the second embodiment of the apparatus, the present invention provides the other information read/write apparatus for reading and recording information on an information storage medium, mounted on a mobile body and allowing information to be read and recorded thereon. The information read/write apparatus is characterized by comprising detection means for detecting that the mobile body is at a standstill, read means for reading information on another information storage medium different from the information storage medium, and further control means for controlling a relocation of information stored on another information storage medium different from the information storage medium onto the information storage medium when the mobile body is detected to be at a standstill for a predetermined length of time or more in accordance with output from the detection means.

As described in the foregoing, the information read/write apparatus according to the present invention first confirms positively that the mobile body is at a standstill to perform the defragmentation execution processing on an information storage medium mounted to the storage medium read apparatus. This thereby allows the vibration caused by the movement of the mobile body to have no effect on the information storage medium under the defragmentation execution processing. Thus, errors can be prevented from being generated while the order of the recorded data files fragmented on the information storage medium is being rearranged.

The second aspect of the present invention has an object of providing a method for correcting an information storage position in which a relocation processing is executed on sectors of an information storage medium, mounted on a mobile body and allowing information to be read and recorded thereon, without causing the relocation processing to be affected by running or mechanical vibration of the mobile body.

To achieve the objects mentioned above, the present invention provides the method comprising the following steps, namely, a step of determining that the mobile body is at a standstill, and of controlling reading/recording of information to relocate information stored on the information storage medium from one to another different position on the sector of the information storage medium while the mobile body is being determined to be at a standstill in accordance with output of the determination.

As another embodiment of the above method, the step of controlling to relocate the information may be started when the mobile body is determined to be at a standstill for a predetermined length of time or more in accordance with the output from the determining step.

As the further embodiment of the above method, the method may comprise the steps of detecting whether vehicle speed pulse is present or not, starting the relocation processing when the vehicle speed pulse is not detected, determining whether the relocation processing is completed, detecting again whether the vehicle speed pulse is present or not when not completed, and canceling the relocation processing when the vehicle speed pulse is detected.

As described in the foregoing, the method for correcting an information storage position according to the present invention first confirms positively that the mobile body is at a standstill to perform the defragmentation execution processing on an information storage medium mounted to the storage medium read apparatus. This thereby allows the vibration caused by the movement of the mobile body to have no effect on the information storage medium under the defragmentation execution processing. Thus, errors can be prevented from being generated while the order of the recorded data files fragmented on the information storage medium is being rearranged. In addition, since it is detected on the way again whether the vehicle speed pulse is generated in the last embodiment, even a long time of the relocation processing can be performed without effect of vibration.

BRIEF DESCRIPTION OF THE DRAWINGS

These and other objects and advantages of the present invention will become clear from the following description with reference to the accompanying drawings, wherein.

DETAILED DESCRIPTION OF THE PREFERRED EMBODIMENTS

Figure 1:
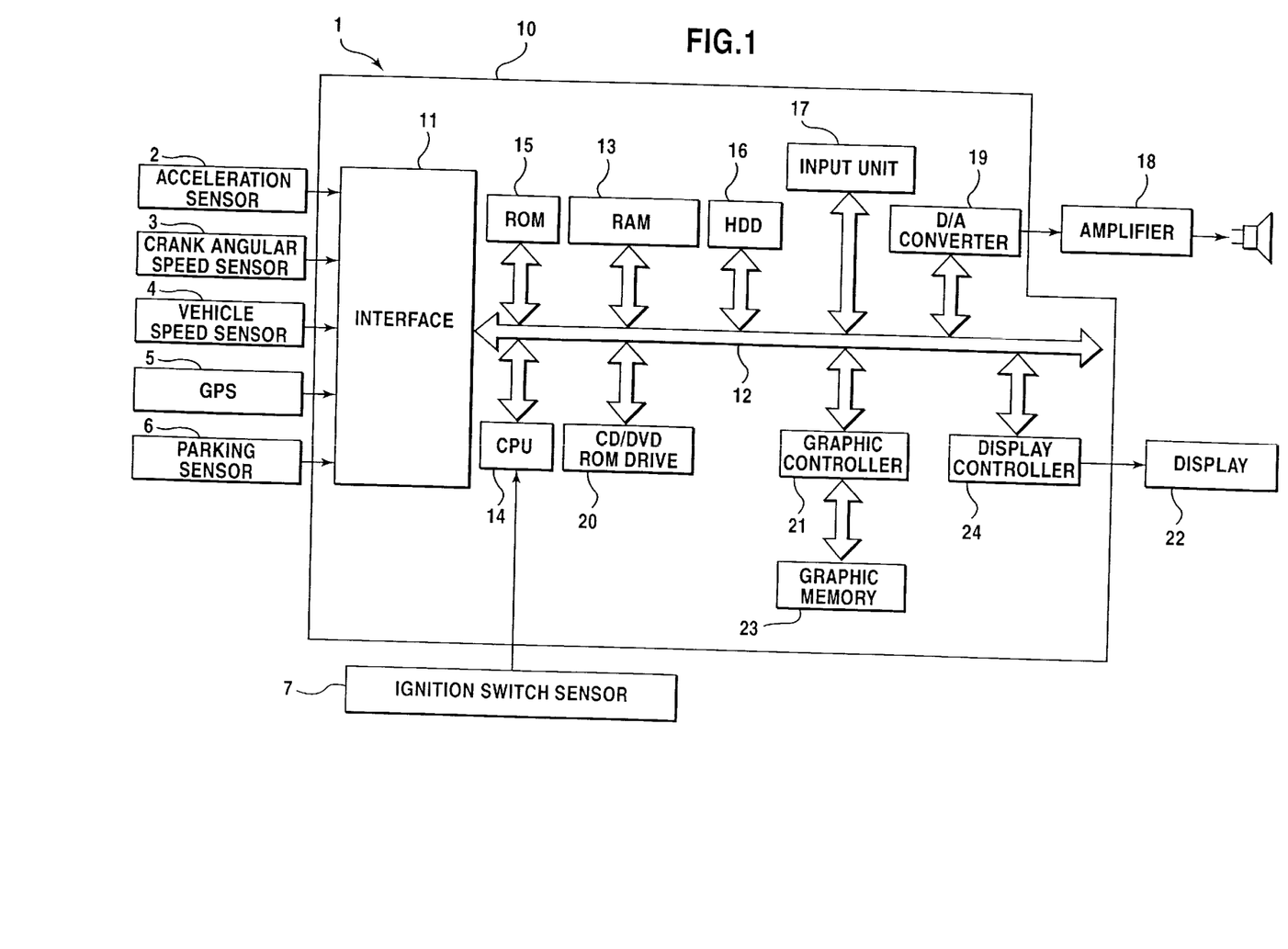
FIG. 1 is a circuit block diagram illustrating the system configuration of a control unit of an information read/write apparatus according to the present invention.
Figure 2:
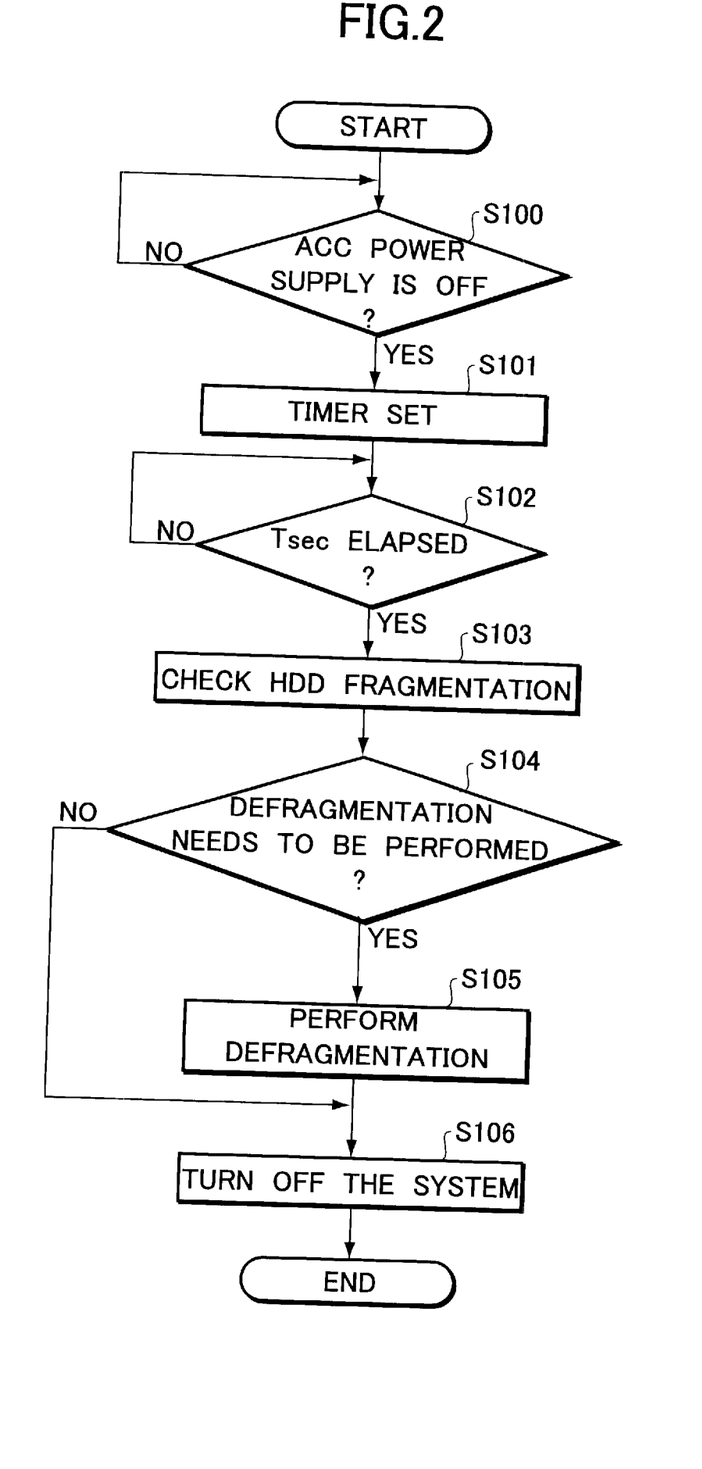
FIG. 2 is a flowchart for explaining a first embodiment of automatic defragmentation execution processing control performed by the control unit.

Now, an embodiment of an information read/write apparatus according to the present invention will be explained below with reference to FIGS. 1 and 2. Incidentally, as a typical example, such an information read/write apparatus will be explained which is mounted on a motor vehicle or a type of mobile body. FIG. 1 is a circuit block diagram illustrating the system configuration of a control unit of the information read/write apparatus according to the present invention. FIG. 2 is a flowchart for explaining the first embodiment of the automatic defragmentation execution processing control carried out by the control unit.

As shown in FIG. 1, the information read/write apparatus 1 according to the present invention mainly comprises various types of sensors 2–7 and a control unit 10 for executing various application programs in accordance with detection signals provided by the various types of sensors 2–7.

The various types of sensors 2–7 are to detect the operating condition of the engine or the running condition of the motor vehicle. The sensors 2–7 include an acceleration sensor 2 used for controlling the engine and the attitude of the motor vehicle, a crank angular speed sensor 3, a vehicle speed sensor 4, a self-containing sensor with a built-in GPS (or a vehicle speed pulse sensor) 5, a parking sensor 6 for detecting a vehicle parked or at a standstill, and an ignition switch sensor 7 used as means for detecting the voltage of the ACC power supply. Detection signals provided by these sensors are inputted to the control unit 10. Incidentally, an ignition key (hereinafter referred to as a key) fitting with the key cylinder for controlling the start and stop of the engine is inserted in the ignition switch sensor 7. The ignition switch sensor 7 detects the key located in its "ACC" (Accessory), "ON", "START", or "OFF" position.

Based on the detected signal provided by the sensors 2–7, the control unit 10 performs operational processing to satisfy an activation determination condition such as for defragmentation execution processing control in accordance with an application program intended for the defragmentation execution processing or download execution processing. When this has resulted in the determination of performing execution processing such as for defragmentation, the control unit 10 is to perform the execution processing such as for defragmentation of an information storage medium.

Describing in more detail, in the control unit 10, the detection signals provided by the various types of sensors 2–6 are converted to digital data by an A/D converter (not shown) via an interface 11. The resulting digital data are stored in a predetermined buffer area of a RAM (Random Access Memory) 13 through a bus 12 for transmitting data or instructions and inputted to a CPU 14 (Central Processing Unit), as is the detection signal outputted from the ignition switch sensor 7. Based on the detection signals provided by the various types of sensors 2–7, the CPU 14 determines whether the motor vehicle is positively at a standstill. Then, based on the resulting determination of the CPU 14, the CPU 14 executes various application programs, which are stored in ROM (Read Only Memory) 15 as firmware, thereby performing the defragmentation execution processing on a HDD 16, described later.

The control unit 10 comprises the following devices, which are connected to the CPU 14 and to one another through the bus 12 so as to exchange data with each other. The devices include the HDD 16 or an information storage medium on which information (data) can be read or recorded repeatedly and an input unit 17 for inputting instructions and data to the information read/write apparatus 1. Also included is a D/A converter 19 for converting internal data to analog data to output the resulting data to an amplifier 18. Also included is a drive 20 or a drive unit for driving media, having information recorded thereon, such as the MD, MO, CD, or DVD. Other devices included are a graphic controller 21 specially designed for processing graphics, a graphic memory 23 for temporarily storing the waiting data to be displayed on a display 22, and a display controller 24 for controlling the resolution or the display color mode of the data to be displayed on the display 22.

FIRST EXAMPLE

Now, the first embodiment of the automatic defragmentation execution processing control performed by the control unit 10 will be explained below with reference to the flowchart of FIG. 2.

The first embodiment is adapted to determine whether the motor vehicle is at a standstill, in accordance with the detection signal from the ignition switch sensor 7. In step 100, it is detected in which position located is the key inserted into the key cylinder. When the key is in any one of the "ACC" to "START" positions, it is judged that the motor vehicle is under a service condition or a condition similar thereto. Then, the process is returned repeatedly to determine in which position the key is located in the key cylinder.

On the other hand, when the key is in its "OFF" position, it is judged that the motor vehicle is not under the service condition but at a standstill. Then, the process proceeds to step 101 to initiate the setting of a timer or a delay means. Thereafter, the process proceeds to step 102, where the process is returned repeatedly to determine whether the delay time Tsec has elapsed which is set in advance on the timer. When the delay time Tsec has elapsed, the process proceeds to step 103 where a fragmentation check is initiated to check how much the files stored on the HDD 16 have been fragmented.

After the fragmentation check has been completed, the process proceeds to step 104 where it is determined in accordance with the result of the fragmentation check whether it is necessary to perform defragmentation of the files stored on the HDD 16, that is, defragment the fragmented files. Here, the level of the fragmentation of the files stored on the HDD 16 is compared with the threshold level set in advance in the control unit 10. When it is found that the level of the fragmentation has exceeded the threshold level, the process proceeds to step 105 where the defragmentation of the HDD 16 is initiated. After the defragmentation of the files stored on the HDD 16 has been completed, the process proceeds to step 106 where the defragmentation execution processing system is turned OFF to end the automatic defragmentation execution processing control.

On the other hand, when it is judged in step 104 that the level of the fragmentation of the files stored on the HDD 16 has not exceeded the threshold level, the process proceeds to step 106 where the defragmentation execution processing system is turned OFF to end the automatic defragmentation execution processing control.

As described above, the first embodiment of the automatic defragmentation execution processing control according to the present invention is adapted to perform the defragmentation execution processing on the HDD 16 after it has been confirmed that the motor vehicle is positively at a standstill. This thereby allows the running or mechanical vibration of the motor vehicle to have no effect on the HDD 16 under the defragmentation execution processing. Thus, errors can be prevented from being generated while the order of the recorded data files fragmented on the HDD 16 is being rearranged.

SECOND EXAMPLE

Now, a second embodiment of the automatic defragmentation execution processing control performed by the control unit 10 will be explained with reference to the flowchart of FIG. 3. Incidentally, the arrangement of the flowchart of the first embodiment employs the detection signal from the ignition switch sensor 7 as the detection means to determine the service condition of the motor vehicle. However, in place of this arrangement, the second embodiment is adapted to employ the detection signal from the vehicle speed sensor 4 (or the vehicle pulse sensor from the GPS). Thus, the explanation will be made on the difference from the first embodiment in contrast therewith. In addition, it is to be understood that, in FIG. 3 representing the feature of this embodiment, the same or equivalent processing in contents as or to that of the first embodiment is given the same reference symbol.

Figure 3:
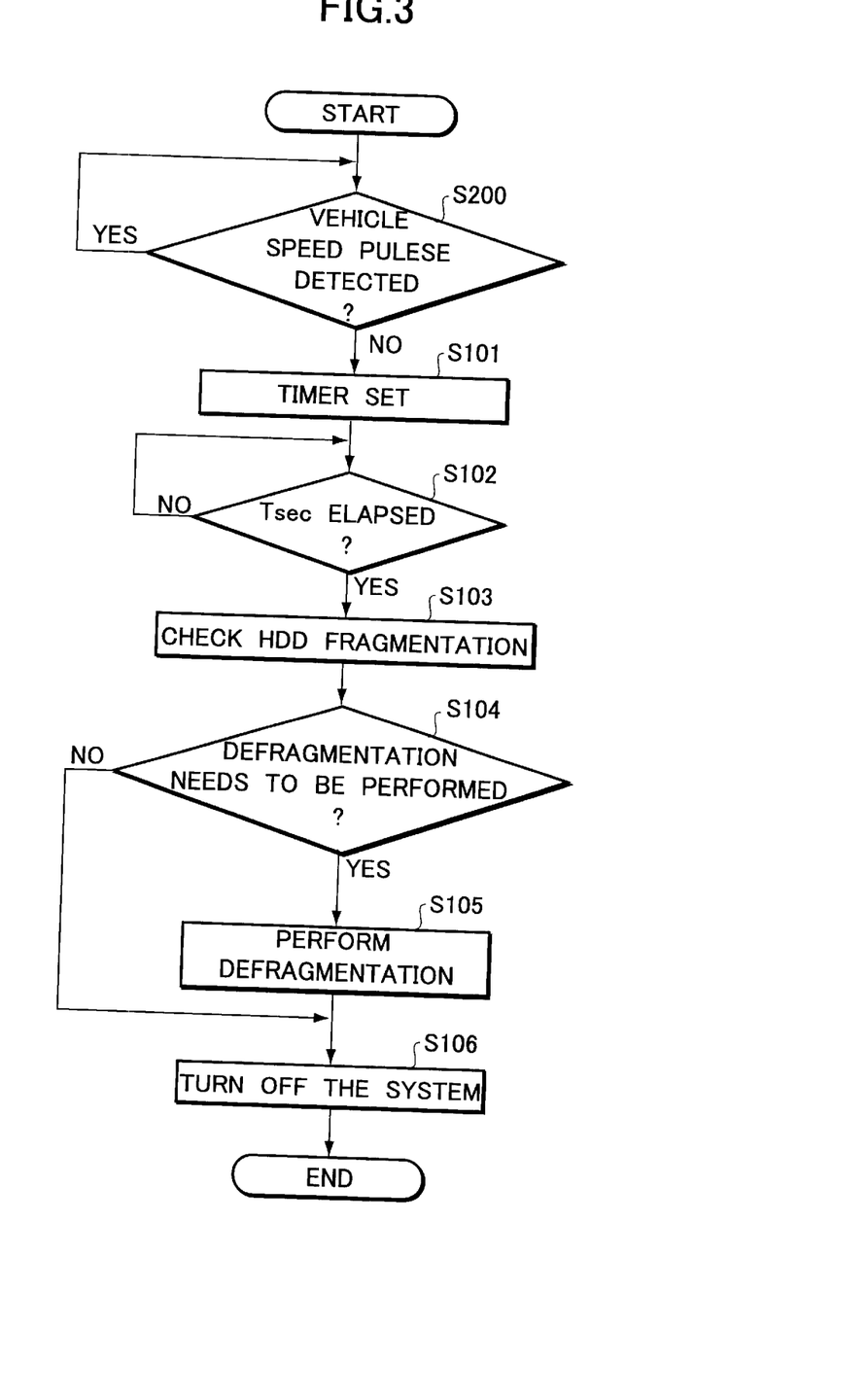
FIG. 3 is a flowchart for explaining a second embodiment of the automatic defragmentation execution processing control performed by the control unit.

That is, as shown in FIG. 3, it is first determined in step 200 whether the vehicle speed pulse is detected. If the vehicle speed pulse is detected, it is judged that the motor vehicle is under service condition. Then, the process is returned such that the determination processing of step 200 is executed repeatedly until the vehicle speed pulse is not detected. On the other hand, if the vehicle speed pulse is not detected in step 200, it is judged that the motor vehicle is at a standstill. Then, as in the first embodiment, the defragmentation execution processing control is executed in step 101 and the subsequent steps.

The second embodiment shows that the automatic defragmentation execution processing control can be performed using detection means different from that used in the first embodiment for detecting the service condition of the motor vehicle. Incidentally, the detection means for detecting the service condition of the motor vehicle employs individually the detection signal from the ignition switch sensor 7, the vehicle speed sensor 4, or the vehicle speed pulse sensor from the GPS. However, instead of this arrangement, the detection signal from other various types of sensors 2, 3, 5, 6 may be individually employed. In addition, the service condition of the motor vehicle may be determined using at least two or more detection signals from the various types of sensors 2–7 to positively confirm that the motor vehicle is at a standstill.

THIRD EXAMPLE

Now, an embodiment of the manual defragmentation execution processing control performed by the control unit 10 will be explained below with reference to the flowchart of FIG. 4. Incidentally, the flowchart of the first and second embodiments is adapted to determine the service condition of the motor vehicle to automatically carry out the defragmentation execution processing control. However, the third example makes it possible for the user to initiate the defragmentation processing at the user's will.

Figure 4:
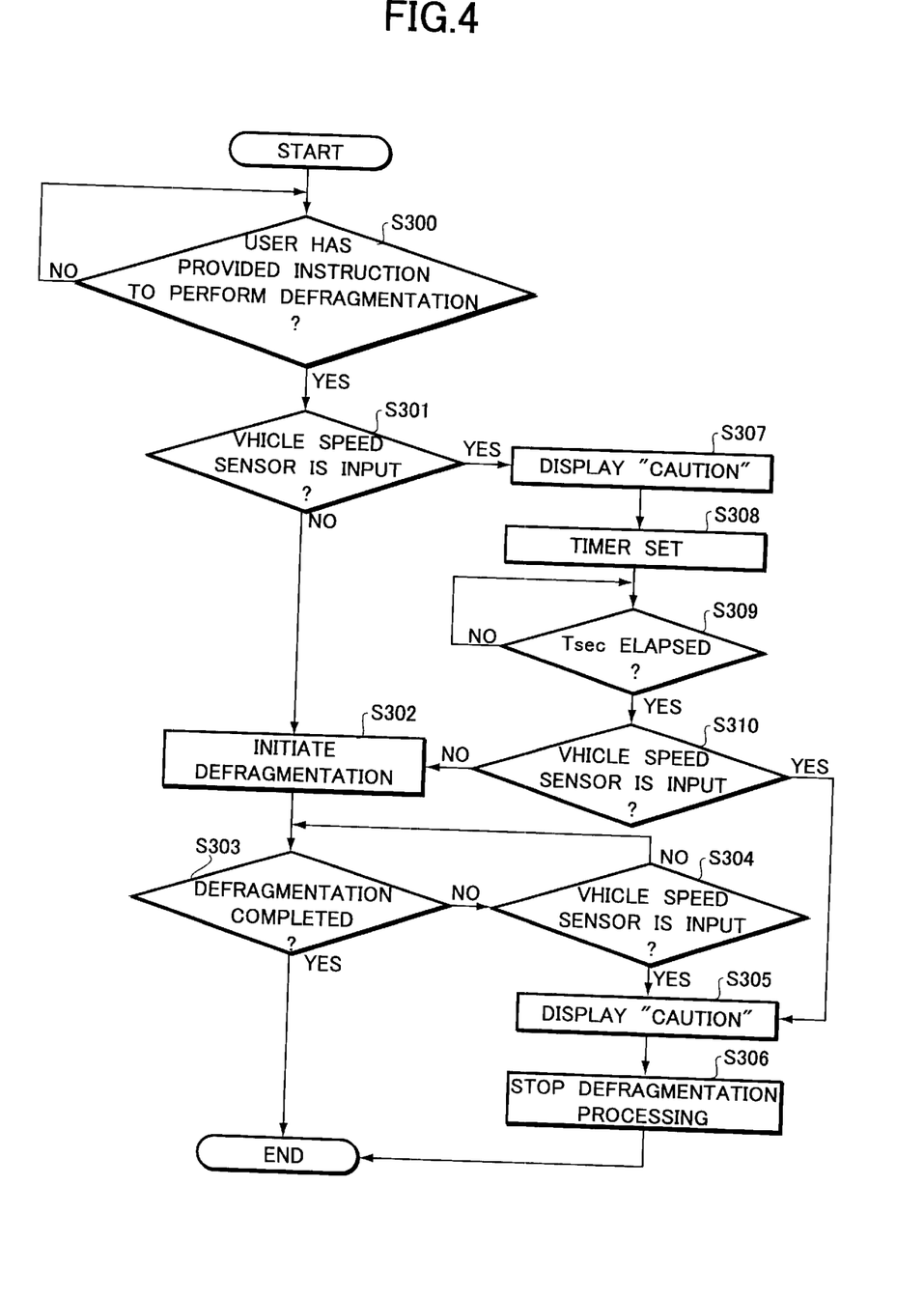
FIG. 4 is a flowchart for explaining a manual defragmentation execution processing control performed by the control unit.

As shown in FIG. 4, it is determined in step 300 whether the user has provided an instruction to perform defragmentation. If no instruction has been provided to perform defragmentation, it is judged that the user intends to perform no defragmentation. Then, the process is returned so that it is repeatedly determined whether the user provides an instruction to perform defragmentation.

On the other hand, if it is judged in step 300 that the user has provided an instruction to perform defragmentation, the process proceeds to step 301 where it is determined whether the vehicle speed sensor provides the detection signal.

If it is judged in step 301 that the vehicle speed sensor provides no detection signal, that is, the motor vehicle is at a standstill, the process proceeds to step 302 where defragmentation of the HDD 16 is initiated.

Then, after the defragmentation of the HDD 16 has been completed, the process proceeds to step 303 where it is determined whether the defragmentation execution processing has been completed. If it is judged that the defragmentation execution processing has been completed, the manual defragmentation execution processing control is ended. On the other hand, if it is judged in step 303 that the defragmentation execution processing has not been performed, the process proceeds to step 304 where it is determined whether the vehicle speed sensor provides the detection signal.

If it is judged in step 304 that the vehicle speed sensor provides no detection signal, the process is returned to proceed to step 303, whereas the process proceeds to step 305 if it is judged that the vehicle speed sensor provides the detection signal.

In step 305, an alarm lamp is lit on the combination meter so that the user can see that it has been judged that the motor vehicle is under the service condition. Thereafter, the process proceeds to step 306 where the defragmentation execution processing is stopped to end the manual defragmentation execution processing control.

Incidentally, if it is judged in step 301 that the vehicle speed sensor provides the detection signal, that is, the motor vehicle is under the service condition, the process proceeds to step 307 where the alarm lamp is lit on the combination meter so that the user can see that it has been judged that the motor vehicle is under service condition. Then, the process proceeds to step 308 where the timer setting is initiated. Thereafter, the process proceeds to step 309, where the process is returned repeatedly to determine whether the delay time Tsec pre-set to the timer has elapsed.

If the delay time Tsec has elapsed, the process proceeds to step 310 where it is determined whether the vehicle speed sensor provides the detection signal. If it is judged that: the vehicle speed sensor provides no detection signal, the process proceeds to step 302 where the defragmentation execution processing is initiated on the HDD 16 and then the processing is performed in step 303 and subsequent steps. On the other hand, if it is judged that the vehicle speed sensor provides the detection signal, the process proceeds to step 305 where the alarm lamp is lit. Thereafter, the process proceeds to step 306 where the defragmentation execution processing is stopped to end the manual defragmentation execution processing control.

According to the third example, the control unit 10 is adapted to be able to perform the manual defragmentation execution processing control. This makes it possible for the user to perform readily the defragmentation of the HDD 16 when the user desires to do so, thus providing improved operability for the user.

Incidentally, the system configuration according to the third example may be combined with any one of those of the first and second examples.

In addition, the third example employs individually the detection signal from the vehicle speed sensor 4 to determine the service condition of the motor vehicle. However, instead of this arrangement, the detection signal from other various types of sensors 2, 3, 5–7 may be individually employed. Furthermore, the service condition of the motor vehicle may be determined using at least two or more detection signals from the various types of sensors 2–7 to positively confirm that the motor vehicle is at a standstill.

FOURTH EXAMPLE

Now, an embodiment of the automatic download execution processing control performed by the control unit 10 will be explained below with reference to the flowchart of FIG. 5. Incidentally, the flowchart of the first example is adapted to determine the service condition of the motor vehicle to automatically carry out the defragmentation execution processing control. However, the fourth example is adapted to perform the processing control for downloading onto the HDD 16, :for example, part or all of the data stored on the ROM disc used with the GPS. The explanation will be made on the difference from the first example in contrast therewith. In addition, it is to be understood that, in FIG. 5 representing the feature of the fourth example, the same or equivalent processing in contents as or to that of the first example is given the same reference symbol.

Figure 5:
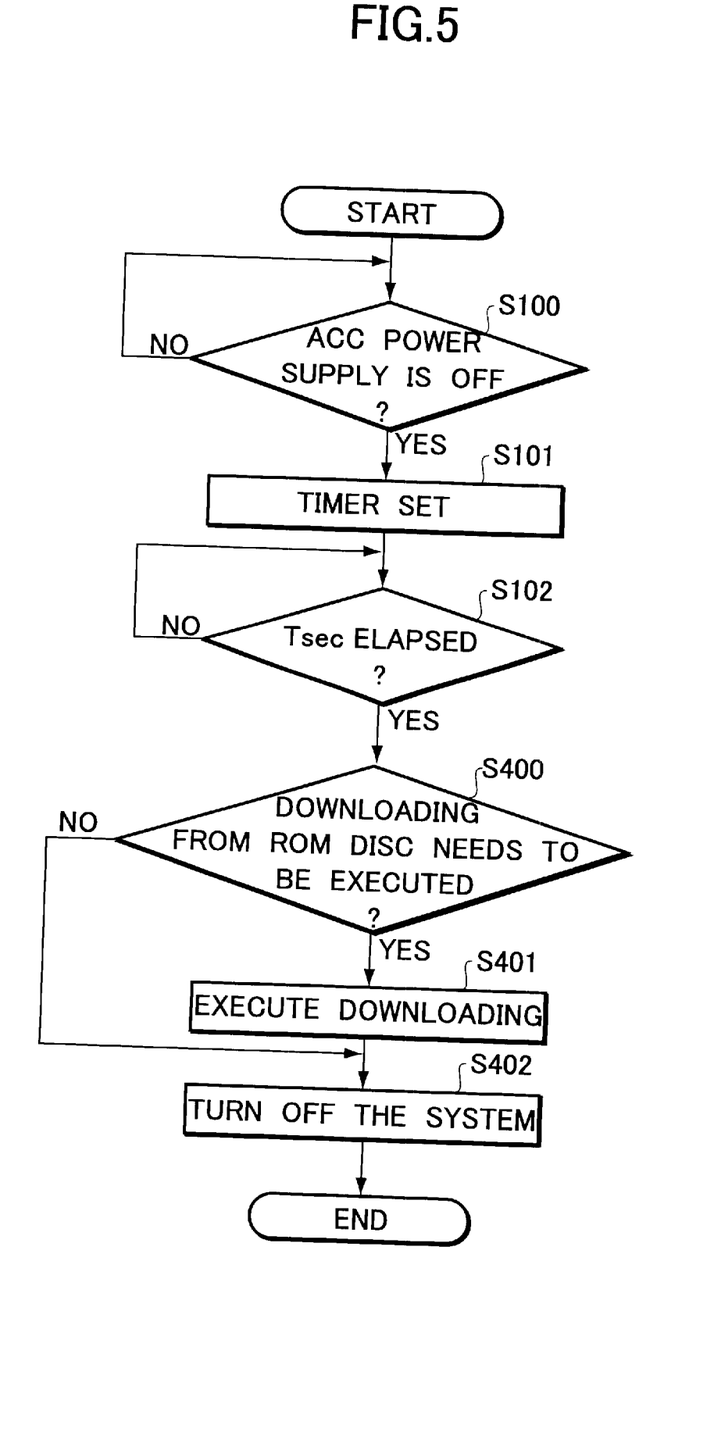
FIG. 5 is a flowchart for explaining an automatic download execution processing control performed by the control unit.

That is, as shown in FIG. 5, after the processing has been completed in steps 100 to 102, the GPS is placed in its inactive state. Then, it is determined in step 400 whether it is necessary to execute downloading from the media mounted on the drive 20 or the GPS to the HDD 16. If it is judged that it is necessary to download part or all of the data stored on the medium mounted on the drive 20, for example, a ROM disc, the process proceeds to step 401 where the downloading of the part or all of the data stored on the ROM disc to the HDD 16 is initiated. Then, after the downloading of the data to the HDD 16 has been completed, the process proceeds to step 402, where the download execution processing system is turned OFF to end the automatic download execution processing control.

On the other hand, when it is judged in step 400 that it is not necessary to execute downloading, the process proceeds to step 402, where the download execution processing system is turned OFF to end the automatic download execution processing control.

As described above, the automatic download execution processing control according to the fourth example of the present invention is adapted to perform the execution processing for downloading data from the ROM disc to the HDD 16 after it has been positively confirmed that the motor vehicle is at a standstill and the GPS is placed in its inactive state. This thereby allows the running or mechanical vibration of the motor vehicle to have no effect on the HDD 16 under the download execution processing. Thus, errors can be prevented from being generated while data is being downloaded to the HDD.

Incidentally, the fourth example is adapted to download data from the ROM disc to the HDD 16, however, the present invention is not limited thereto and can be applied to other cases where data is downloaded from other media to the HDD 16.

Furthermore, the system arrangement of the fourth example may be combined with any one of those of the first to third examples.

Incidentally, the information read/write apparatus according to the present invention can be applied to a vehicle-mounted device to be mounted to a mobile body, for example, an audio visual device or a GPS. It can also be applied to an information storage medium externally connectable to the information read/write apparatus, or the storage and replacement of data in information communications.

While there has been described what are at present considered to be preferred embodiments of the present invention, it will be understood that various modifications may be made thereto, and it is intended that the appended claims cover all such modifications as fall within the true spirit and scope of the invention.

What is claimed is:

1. An information read/write apparatus for reading and recording information on an information storage medium, mounted on a mobile body and allowing information to be read and recorded thereon, comprising:

detection means for detecting that said mobile body is at a standstill, and control means for controlling reading/recording of information to relocate information stored on said information storage medium from one to another different position on said information storage medium while said mobile body is being detected to be at a standstill in accordance with output of said detection means.

2. The information read/write apparatus according to claim 1, wherein said control means controls reading and recording of information to relocate information stored on said information storage medium from one to another different position on said information storage medium when said mobile body is detected to be at a standstill for a predetermined length of time or more in accordance with the output from said detection means.

3. An information read/write apparatus for reading and recording information on an information storage medium, mounted on a mobile body and allowing information to be read and recorded thereon, comprising:

detection means for detecting that said mobile body is at a standstill, read means for reading information on another information storage medium different from said information storage medium; and control means for controlling a relocation of information stored on said another information storage medium different from said information storage medium onto said information storage medium when said mobile body is detected to be at a standstill for a predetermined length of time or more in accordance with output from said detection means.

4. An information read/write apparatus for reading and recording information on an information storage medium, mounted on a mobile body and allowing information to be read and recorded thereon, comprising:

a detector for detecting that said mobile body is at a standstill, and a controller for controlling reading/recording of information to relocate information stored on said information storage medium from one to another different position on said information storage medium while said mobile body is being detected to be at a standstill in accordance with output of said detection means.

5. The information read/write apparatus according to claim 4, wherein said controller controls reading and recording of information to relocate information stored on said information storage medium from one to another different position on said information storage medium when said mobile body is detected to be at a standstill for a predetermined length of time or more in accordance with the output from said detector.

6. An information read/write apparatus for reading and recording information on an information storage medium, mounted on a mobile body and allowing information to be read and recorded thereon, comprising:

at least one detector for detecting that said mobile body is at a standstill, a reader for reading information on another information storage medium different from said information storage medium; and a controller for controlling a relocation of information stored on said another information storage medium different from said information storage medium onto said information storage medium when said mobile body is detected to be at a standstill for a predetermined length of time or more in accordance,with output from said detector.

7. A method for correcting an information storage position in which a relocation processing is executed on sectors of an information storage medium, mounted on a mobile body land allowing information to be read and recorded thereon, said method comprising the steps of:

determining that said mobile body is at a standstill; and controlling reading/recording of information to relocate information stored on said information storage medium from one to another different position on said sector of said information storage medium while said mobile body is being determined to be at a standstill in accordance with output of said determination.

8. The method for correcting an information storage position according to claim 7, wherein reading and recording of information is controlled to relocate said information stored on said information storage medium from one to another different position on said sector of said information storage medium when said mobile body is determined to be at a standstill for a predetermined length of time or more in accordance with said output from said determination.

9. The method for correcting an information storage position according to claim 7, wherein it is determined that said mobile body is at a standstill when an ACC power supply is OFF.

10. The method for correcting an information storage position according to claim 7, wherein it is determined that said mobile body is at a standstill when vehicle speed pulse is not detected.

11. A method for correcting an information storage position in which a relocation processing is executed on sectors of an information storage medium, mounted on a mobile body and allowing information to be read and recorded thereon, said method comprising the steps of:

detecting whether vehicle speed pulse is present or not;

starting said relocation processing when said vehicle speed pulse is not detected;

determining whether said relocation processing is completed;

detecting again whether said vehicle speed pulse is present or not when not completed; and canceling said relocation processing when said vehicle speed pulse is detected.

* * * * *